United States Patent
Sakurai

[19]

[11] Patent Number: 5,993,060
[45] Date of Patent: Nov. 30, 1999

[54] TEMPERATURE SENSOR AND METHOD OF ADJUSTING THE SAME

[75] Inventor: Yasuhiro Sakurai, Tokorozawa, Japan

[73] Assignee: Citizen Watch Co., Ltd., Tokyo, Japan

[21] Appl. No.: 09/006,932

[22] Filed: Jan. 14, 1998

[30] Foreign Application Priority Data

Jan. 14, 1997 [JP] Japan ................................. 9-004486

[51] Int. Cl.⁶ ............................. G01K 15/00; G01K 7/01
[52] U.S. Cl. ............................................. 374/178; 374/1
[58] Field of Search .................................. 374/1, 183, 3, 374/178

[56] References Cited

U.S. PATENT DOCUMENTS

| | | | |
|---|---|---|---|
| 4,395,139 | 7/1983 | Namiki et al. ........................ | 374/183 |
| 5,051,615 | 9/1991 | Rosenthal ............................. | 374/183 |
| 5,315,280 | 5/1994 | Cordoba et al. ...................... | 323/313 |
| 5,645,352 | 7/1997 | Menten ................................. | 374/183 |

FOREIGN PATENT DOCUMENTS

| | | | |
|---|---|---|---|
| 0321450 | 6/1989 | European Pat. Off. ............... | 374/163 |
| 61-88119 | 5/1986 | Japan . | |

*Primary Examiner*—Diego Gutierrez
*Assistant Examiner*—G. Verbitsky

*Attorney, Agent, or Firm*—Armstrong, Westerman, Hattori, McLeland & Naughton

[57] ABSTRACT

In a temperature sensor, between a first power supply and a second power supply, there are disposed a resistor group consisting of a plurality of resistors connected in series and a MOS transistor in the form of a temperature transducer, the resistor group being connected in series with the MOS transistor having a drain connected to the resistor group and having a source and a bulk which are connected to the first power supply. The temperature sensor further comprises a switch group consisting of switches for opening and closing the connections between the connection points of the adjacent resistors of the resistor group and the second power supply, an external terminal connected to the drain of the MOS transistor, a temperature-compensated constant voltage generating circuit for generating a gate voltage as an output voltage to the MOS transistor, and a non-volatile memory which stores therein data for adjusting the output voltage from the temperature-compensated constant voltage generating circuit and the state of opening and closing of the switches of the switch group. With the voltage at the second power supply as the reference, the drain voltage at the MOS transistor is output as temperature information to the external terminal.

7 Claims, 4 Drawing Sheets

TEMPERATURE SENSOR AND METHOD OF ADJUSTING THE SAME

BACKGROUND OF THE INVENTION

1. Field of the Invention

The present invention relates generally to a temperature sensor provided with adjusting means for modifying manufacturing variations and a method of adjusting the same, and more particularly to a temperature sensor for use in a temperature-compensated crystal oscillator intended to be mounted on small-sized electronic equipment such as cellular phones and a method of adjusting the same.

2. Description of the Related Art

Electronic equipment having a temperature compensating function, such as a temperature-compensated crystal oscillator intended to be mounted on cellular phones, has to be provided with a temperature sensor which detects a variation in temperature to provide an output in the form of a variation in an electrical characteristic.

A typical temperature sensor is one using the pn junction of a diode for example, which has a satisfactory detection accuracy but entails a problem in that it must be used as an external component due to its inability to be incorporated into an IC.

Therefore, another type of temperature sensor is also available which detects temperature through the provision, in analog representation, of an output from an oscillating circuit having a temperature-dependent oscillating frequency. However, this method may result in increased costs and in generation of phase noises.

A temperature sensor used in a conventional temperature-compensated type crystal oscillator comprises, as disclosed in Japanese Patent Laid-open Pub. No. 61-88119 for example, a constant current circuit and a ring oscillating circuit driven by an output from the constant current circuit, the ring oscillating circuit including a plurality of integral delay circuits and a plurality of inverters connected in series with the integral delay circuits, each integral delay circuit consisting of a plurality of resistors and capacitors having certain temperature coefficients.

In order to ensure the output of accurate temperature information by use of such a conventional temperature sensor, it is necessary to keep the temperatures of the resistors and capacitors of the integral delay circuits the same, with the same temperature coefficients.

Although various types of temperature sensors for use in the temperature-compensated crystal oscillator have been put to practical use without being limited to the above example, the temperature coefficients of the resistors and capacitors suffer from manufacturing variations since they are industrial products.

Further, in the case where the temperature coefficients of the resistors and capacitors have deviated from the standards due to manufacturing variations, it is impossible to make the temperature sensors conform with each other through adjustment, resulting in reduced yield and in increased production costs because of severe manufacturing conditions.

Furthermore, the temperature sensor used in such a temperature-compensated type crystal oscillator has often subjected the electronic equipment mounted with the same to an excessive load, namely, a fingerprinting of the temperature sensor using a thermostatic bath, which brings about a further increased cost.

In addition, due to strict phase noise restrictions in the case of an oscillator mounted on a cellular phone, such an oscillating-type temperature sensor is difficult to use as the temperature sensor for temperature compensation therein, since it generates phase noise.

The present invention was conceived in order to solve the above problems. It is therefore the object of the present invention to provide a temperature sensor allowing the detection of temperature without providing the oscillating circuit which is capable of outputting accurate analog temperature information through the adjustment of the manufacturing variations without adding to production costs, and to provide a method of adjusting the same.

SUMMARY OF THE INVENTION

In order to achieve the above object, the temperature sensor of the present invention comprises a first power supply and a second power supply; a resistor group connected to the second power supply consisting of a plurality of resistors connected in series; a switch group consisting of a plurality of switches for opening and closing connections between connection points of adjacent resistors of the resistor group and the second power supply; a MOS transistor in the form of a temperature transducer connected in series with the resistor group and having a source and a bulk which are connected to the first power supply; an external terminal connected to a drain of the MOS transistor; a temperature-compensated constant voltage generating means (voltage regulator) receiving a reference voltage from the first power supply and applying a gate voltage as its output voltage to the MOS transistor; and a non-volatile memory which stores therein data for adjusting the output voltage from the temperature-compensated constant voltage generating means and the state of opening and closing of the switches of the switch group; wherein, with the voltage at the second power supply as the reference, the drain voltage at the MOS transistor is applied as temperature information to the external terminal.

The method of regulating the temperature sensor according to the present invention comprises the steps of performing a resistance regulation by writing to the non-volatile memory the adjusting data for setting the state of opening and closing of each switch of the switch group so that a resistance value between the external terminal and the second power supply results in a predetermined value.

Afterwards, an output voltage from the temperature-compensated constant voltage generating means has only to be adjusted by writing the adjusting data to the non-volatile memory so that an output voltage from the external terminal with the voltage at the second power supply as reference results in a predetermined value.

The temperature sensor in accordance with the present invention may possibly be used as a single thermometer or alternatively serve as a part of the system to output the temperature information to the internal circuit.

Since in this case the temperature information is not outputted to the exterior, there is no need to put the external terminal into an effective state after the adjustment for eliminating the manufacturing variations of the resistors and temperature transducers.

In such a case, a switch may be provided on the external terminal in order to ensure that the connection with the external terminal can be interrupted except during adjustment, or alternatively, a couple of temperature sensors having the same characteristics may be formed, only one of which is provided with an external terminal for adjustment and the other of which is used to provide the temperature information to the internal circuit, whereby the adjustment of the temperature sensor achieves simultaneous adjustment of the other temperature sensor.

To this end, there is provided a temperature sensor comprising two circuits connecting the resistor groups having like characteristics and the MOS transistors in series between the first power supply and the second power supply; two switch groups each consisting of a plurality of switches for opening and closing connections between connection points of the adjacent resistors of each of the two resistor groups and the second power supply; an external terminal connected to a drain of one of said MOS transistors; a temperature-compensated constant voltage generating means applying the same gate voltage as its output voltage to each of the MOS transistors; and a non-volatile memory which stores therein data for adjusting the output voltage from the temperature-compensated constant voltage generating means and the state of opening and closing of each switch of the switch groups; wherein, with the voltage at the second power supply as the reference, a drain voltage at the other of said MOS transistors is applied as temperature information to an internal circuit.

This method of adjusting the temperature sensor is similar to the above temperature sensor adjusting method and thereby ensures a supply of accurate temperature information to the internal circuit without being affected by noise or the like from the external terminal.

Furthermore, using the same configuration as that of the above temperature sensor, the external terminal may be connected via an external terminal switch to the drain of the MOS transistor so that the drain voltage at the MOS transistor is applied as temperature information to the internal circuit, thereby making it possible to provide accurate temperature information to the internal circuit without being affected by noise or the like from the external terminal after the adjustment.

This method of adjusting the temperature sensor being similar to the above temperature sensor adjusting method, the external terminal switch is opened after the execution of the above resistance adjustment and after the output voltage adjustment of the above temperature-compensated constant voltage generating means with the external terminal switch closed state.

The closed state and the open state of the external terminal switch may be effected by writing to the non-volatile memory the adjusting data for setting the open and closed state of the switch.

The above and other objects, features and advantages of the invention will be apparent from the following detailed description which is to be read in conjunction with the accompanying drawings.

DETAILED DESCRIPTION OF THE PREFERRED EMBODIMENTS

Figure 1:
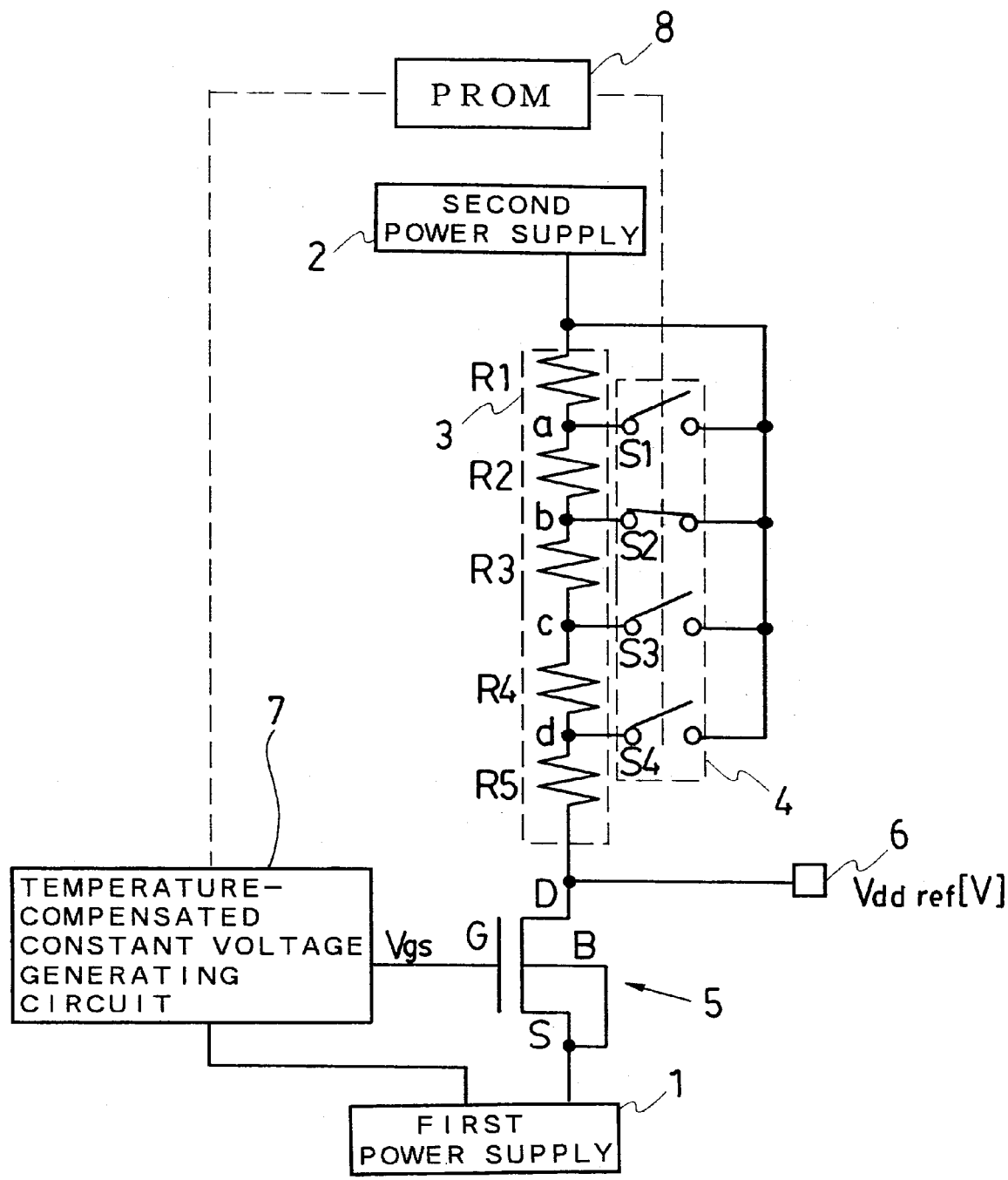
FIG. 1 is a block circuit diagram showing the configuration of the temperature sensor in accordance with a first embodiment of the present invention.

The embodiments of the present invention will now be described with reference to the drawings.
First Embodiment: FIG. 1

A first embodiment of the present invention will be described and reference made to FIG. 1 to first describe a construction of a temperature sensor thereof.

The temperature sensor of the first embodiment comprises a first power supply 1, a second power supply 2 for providing a reference voltage for the adjustment of resistance and the output of temperature information, a resistor group 3 consisting of a plurality of resistors R1 to R5 connected in series whose one end is connected to the second power supply 2, and a MOS transistor 5 in the form of a temperature transducer having a drain D connected to the other end of the resistor group 3 and having a source S and a bulk B which are connected to the first power supply 1.

It further comprises a switch group 4 consisting of a plurality of switches S1 to S4 for opening and closing connection circuits between connection points a to d of the resistors R1 to R5 of the resistor group 3 and the second power supply 2, an external terminal 6 connected to the drain of the MOS transistor 5, a temperature-compensated constant voltage generating circuit (voltage regulator) 7 supplied with power from the first power supply 1 for applying a gate voltage to the MOS transistor 5, and a PROM 8 in the form of a non-volatile memory for storing therein adjusting data to perform the adjustment of output voltage output from the constant voltage generating circuit 7 and to control the opening and closing of the switches S1 to S4 of the switch group 4.

The external terminal 6 receives the drain voltage output as temperature information, the drain voltage being varied in response to a temperature detected by the MOS transistor 5 with the voltage of the second power supply 2 employed as a reference.

The PROM 8 designated herein serves to set the state of opening and closing of the switches S1 to S4 of the switch group 4 and to set the value of the voltage output from the temperature-compensated constant voltage generating circuit 7, according to the adjusting data written externally by, e.g., a ROM writer. No particular novelty lies in the circuit for setting (controlling) the state of opening and closing of the switches S1 to S4 and the voltage output from the temperature-compensated constant voltage generating circuit by reading the adjusting data of the PROM 8, of which, therefore, description will be omitted. It may be noted that the switches S1 to S4 of the switch group 4 are electronic switches such as switching transistors allowing the control of opening and closing in response to a signal.

The temperature sensor of the first embodiment is able to eliminate manufacturing variations in the temperature information output through the adjustment in accordance with the following procedures.

The resistance value between the external terminal 6 and the second power supply 2 is first measured, and then an opening and closing state of the switches S1 to S4 of the switch group 4 are adjusted by writing the adjusting data to the PROM so as to obtain predetermined resistance value. With the adjustment, the resistance group 3 is allowed to have the predetermined value, thereby eliminating any manufacturing variation in the resistance value.

After the adjustment of the resistance, an output voltage from the external terminal 6 is measured with respect to the second power supply 2 having the reference voltage, and adjusting data are written to the PROM 8 so that the value results in a predetermined voltage value, to thereby control the voltage output from the temperature-compensated constant voltage generating circuit 7.

This allows elimination of any manufacturing variation in the threshold voltage of the MOS transistor 5.

In this case, the group of resistors 3 may be formed from, e.g., a polycrystal silicon film containing a high-concentration impurity so that the temperature coefficient can remain substantially zero irrespective of the manufacturing variation in the machining accuracy or the impurity concentration, thereby making it possible to entirely ignore the manufacturing variation as compared with the temperature coefficient of the MOS transistor 5.

Accordingly, in the case of adjusting the resistance of the temperature sensor in the first embodiment, the resistance value has only to be adjusted at a certain temperature. This resistance adjustment completes the absolute value adjustment required for the temperature sensor.

The temperature coefficient of the current flowing through the MOS transistor 5 is unitarily defined from a difference between the gate voltage and the threshold voltage as long as the MOS transistor 5 is manufactured from the same manufacturing steps, so that it is sufficient to adjust the applied gate voltage by the amount of the manufacturing variation in threshold voltage of the MOS transistor 5.

At that time, there is no need to measure the threshold voltage of the MOS transistor 5 since the adjustment of the resistor group 3 is complete, so that it is sufficient that the output voltage from the external terminal 6 is measured with respect to the second power supply 2 having a reference voltage to thereby adjust the voltage output from the temperature-compensated constant voltage generating means 7 so that the value results in a predetermined voltage value. This adjustment completes the sensitivity adjustment required for the temperature sensor.

Figure 4:
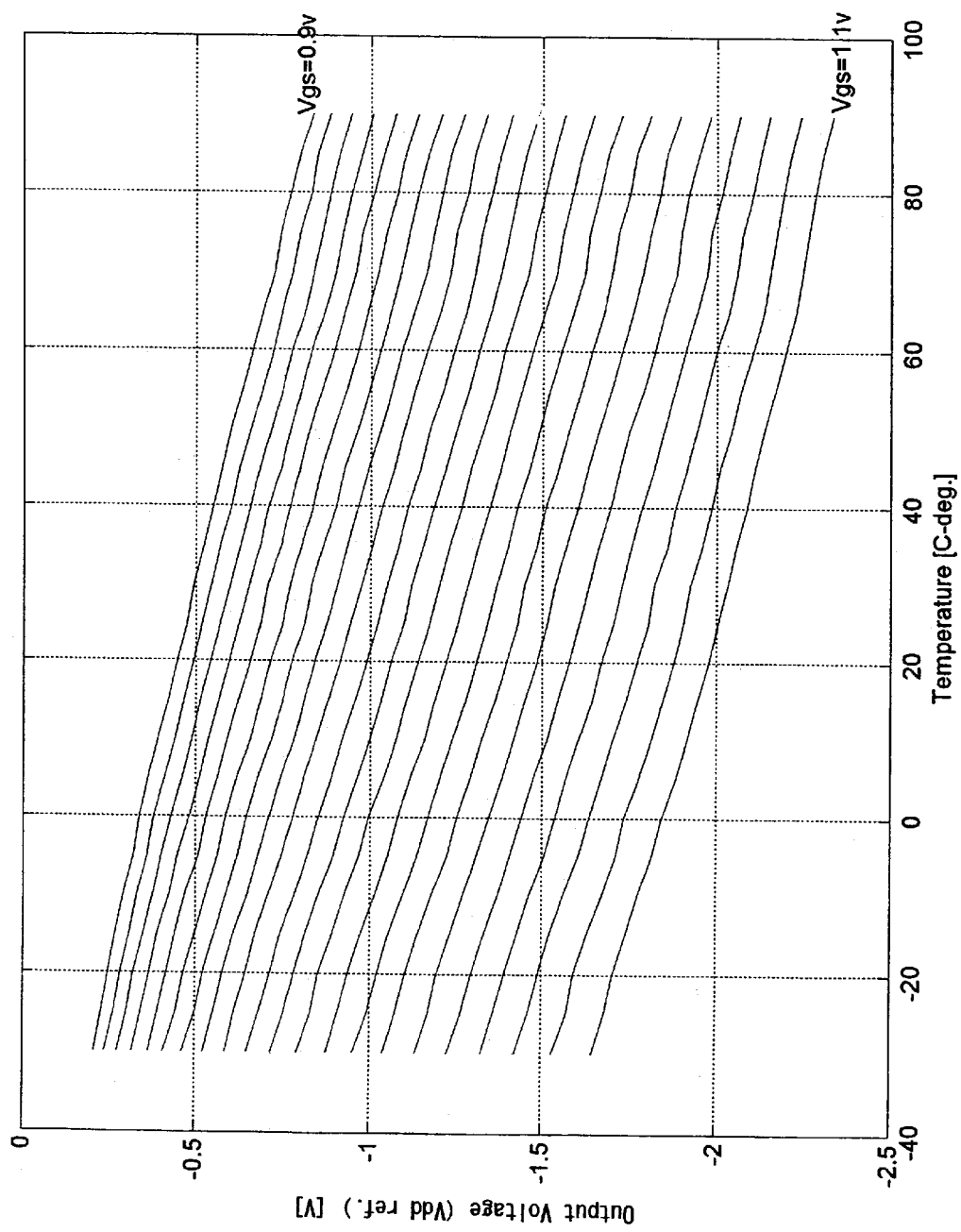
FIG. 4 illustrates curves indicative of temperature characteristics of an output voltage in the case of using as a parameter a gate voltage at a MOS transistor for use in the temperature sensor of the present invention.

FIG. 4 illustrates a temperature characteristic of the above-mentioned output voltage Vdd ref., with the gate voltage Vgs of the MOS transistor employed as a parameter.

In this manner, the construction of the temperature sensor of the first embodiment shown in FIG. 1 provides a temperature sensor capable of eliminating manufacturing variation through the adjustment described above.

It is to be appreciated that since the MOS transistor 5 has a constant current characteristic, the current flowing therethrough is unvaried irrespective of any variations in the drain-source voltage as long as the gate-source voltage is unvaried. Therefore, the temperature sensor of this embodiment having the first power supply 1 as the reference voltage of the temperature-compensated constant voltage generating circuit 7 is not influenced by any variation in the potential difference between the first power supply 1 and the second power supply 2, that is, by variation in the power supply voltage. The output voltage Vdd ref. does not vary depending on the above constant current characteristic since it employs as its reference the voltage of the second power supply 2.

By the way, the output voltage output from the temperature-compensated constant voltage generating circuit 7 is adjusted on the basis of the adjusting data stored in the PROM 8, with the result that the initial output voltage may naturally contain a manufacturing variation.

It is also natural that the conditions of the type of temperature compensation are not too restrictive, but the requirement in the case of having a temperature dependency is to have no manufacturing variation.

Figure 2:
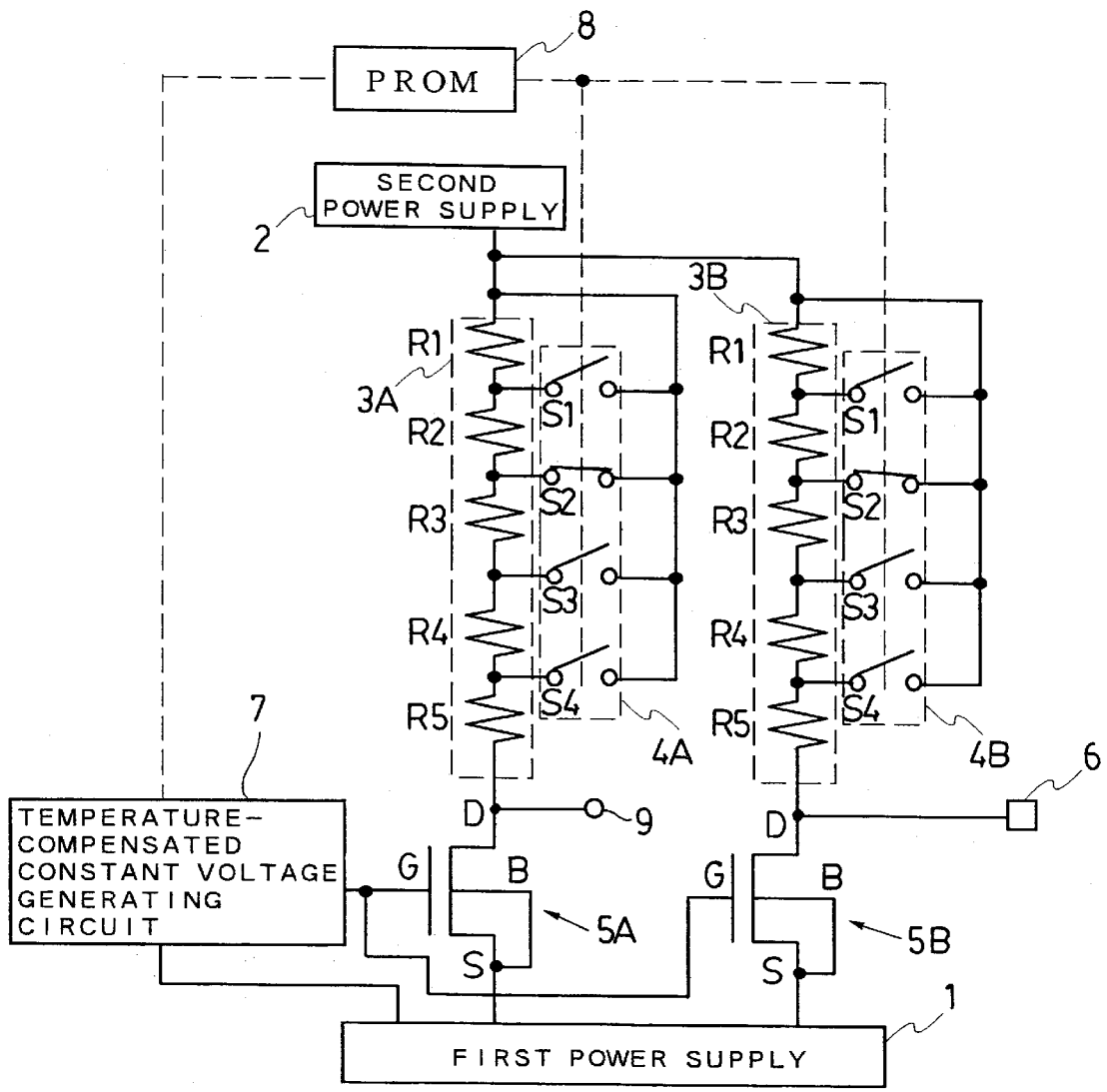
FIG. 2 is a block circuit diagram showing the configuration of the temperature sensor in accordance with a second embodiment of the present invention.

Second Embodiment: FIG. 2

A second embodiment of the present invention will now be described and reference is made to FIG. 2 to first describe a construction of the temperature sensor thereof. In FIG. 2, parts corresponding to those of FIG. 1 are designated by the same reference numerals.

In place of the series circuit consisting of the resistor group 3 and the MOS transistor 5 in the temperature sensor of the first embodiment shown in FIG. 1, the temperature sensor of the second embodiment comprises a series circuit consisting of a first group of resistors 3A and a MOS transistor 5A in the form of a temperature transducer, and a series circuit consisting of a second group of resistors 3B and a MOS transistor 5B in the form of a temperature transducer, the two series circuits being connected in parallel between the first power supply 1 and the second power supply 2.

Both the first group of resistors 3A and the second group of resistors 3B have the same construction as that of the resistor group 3 shown in FIG. 1 and are associated respectively with groups of switches 4A and 4B each consisting of a plurality of switches S1 to S4 interposed between connection points of the adjacent resistors and the output terminal of the second power supply 2.

The switches S1 to S4 of the each group of switches 4A and 4B are controllably opened or closed in the same manner on the basis of adjusting data written to the PROM 8.

The each MOS transistor 5A and 5B have respective sources S and bulks B connected to the first power supply and are supplied with the same gate voltage by the temperature-compensated constant voltage generating circuit 7.

It is to be noted that the two MOS transistors 5A and 5B and the first and second groups of resistors 3A and 3B used have not only the same dimensions but also the same electric characteristics.

Although the temperature sensor of the second embodiment comprises the two sets of series connections each consisting of the MOS transistor and the resistor group having the same characteristics, the reason for providing two sets is as follows.

That is, as described in the above first embodiment, it is necessary to make a measurement using the external terminal 6 in order to eliminate manufacturing variation in the temperature sensor. However, if the temperature information is provided only to the internal circuit without being fed to the exterior, there is no need for an external terminal 6 after completion of the adjustment.

In such a case, the construction of the first embodiment may possibly allow the temperature information utilized by the internal circuit to be disturbed by noise or the like from the external terminal 6.

Thus, there may be provided two sets of series connections including the MOS transistors 5A and 5B and the groups of resistors 3A and 3B having the same characteristics to use one of them only for the adjustment through the connection to the external terminal 6 and then using the other for the supply of the temperature information from the internal terminal 9 to the internal circuit, thereby preventing the temperature information utilized by the internal circuit from being disturbed by noise or the like from the external terminal 6.

Although it is natural that two sets of the switches 4A and 4B be provided for opening and closing the circuits between the connection points of the adjacent resistors of the resistor groups 3A and 3B and the second power supply 2 as shown in FIG. 2, it is effective in order to achieve a simplified adjustment to open or close the two sets of switches 4A and 4B by use of the same adjusting data written to the PROM 8. It is to be appreciated that the adjusting data for the switches 4A and 4B may separately be provided as long as they have the same contents and are simultaneously rewritten.

The procedure for adjusting the temperature sensor in the second embodiment is the same as in the case of the first embodiment described above. It is natural that the external terminal 6 be used for the measurement of the resistance value and of the output voltage during the adjustment.

Thus, the execution of the absolute value adjustment and sensitivity adjustment associated with the MOS transistor 5B results in a similar adjustment associated with the MOS transistor 5A.

According to the temperature sensor of the second embodiment in this manner, upon the supply of temperature information to the internal circuit, the temperature information can be provided without being affected by noise from the external terminal 6.

Figure 3:
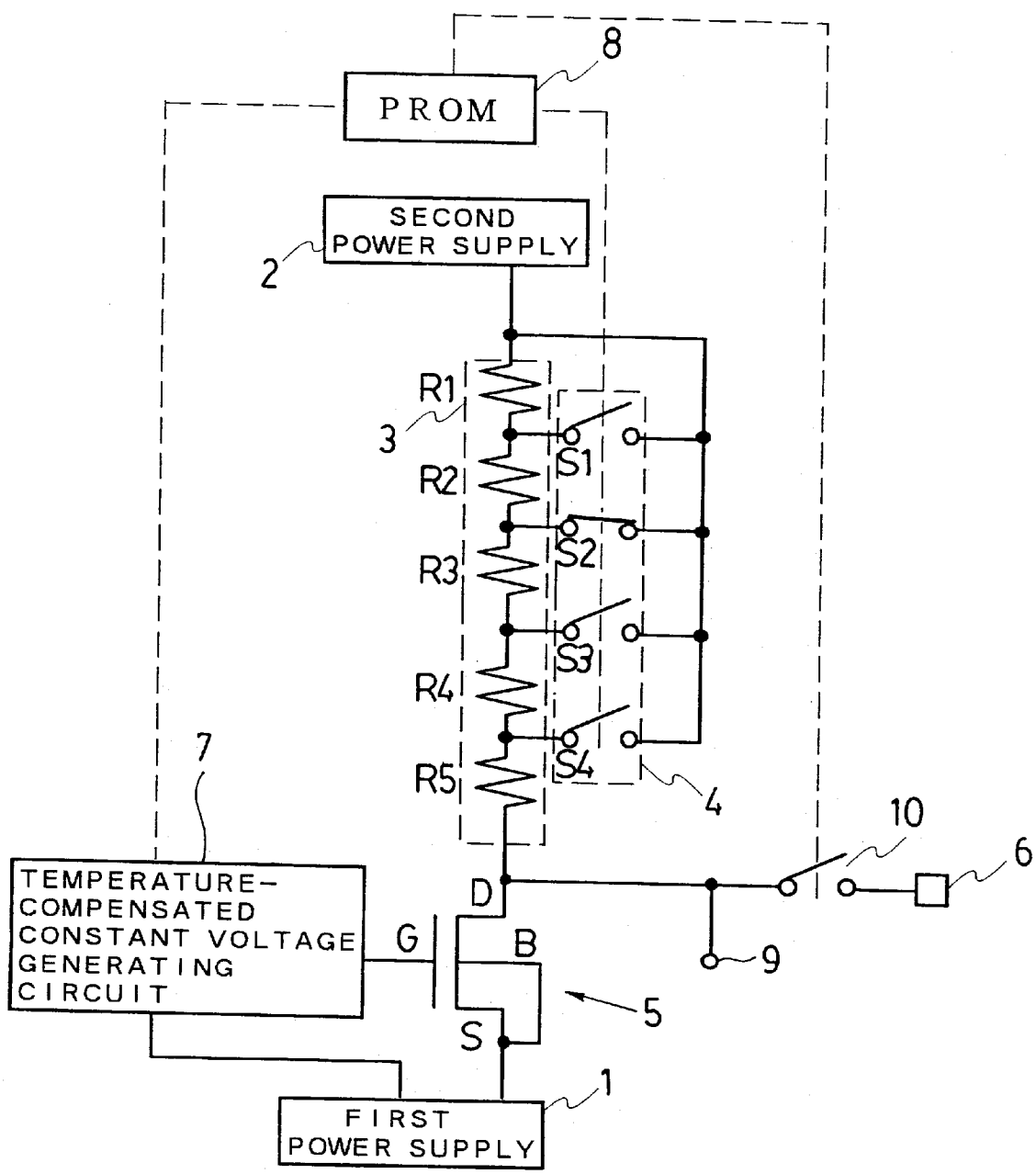
FIG. 3 is a block circuit diagram showing the configuration of the temperature sensor in accordance with a third embodiment of the present invention.

Third Embodiment: FIG. 3

A third embodiment of the present invention will now be described and reference is made to FIG. 3 to first describe a construction of the temperature sensor thereof. In FIG. 3, parts corresponding to those of FIG. 1 are designated by the same reference numerals.

The temperature sensor of the third embodiment differs from the first embodiment shown in FIG. 1 only in that the external terminal 6 is connected via an external terminal switch 10 to the drain D of the MOS transistor 5 in the form of a temperature transducer instead of direct connection thereto, with the drain D being associated directly with the internal terminal 9.

The switch 10 is controllably opened or closed on the basis of adjusting data of the PROM 8. Accordingly, adjusting data for putting the external terminal switch 10 into the open state are written to the PROM 8 so that the switch 10 can be kept open to prevent noise or the like from the external terminal 6 from acting on the internal terminal 9 for providing the temperature information to the internal circuit.

Since the external terminal switch 10 must naturally be put into the closed state at the stage of the execution of the adjustment for eliminating the manufacturing variation, the writing to the PROM 8 of the adjusting data for putting the external terminal switch 10 into the open state should be performed at the final stage of the adjustment.

It is also to be naturally appreciated that the resistance in the closed state, namely, the on resistance of the external terminal switch 10, must be much lower than the series resistance value of the resistor group 3.

Similar to the temperature sensor of the second embodiment shown in FIG. 2, the temperature sensor of the third embodiment is also an example of the temperature sensor permitting only the output of the temperature information to the internal circuit without any external output.

Dissimilar to the second embodiment, however, the third embodiment achieves manufacturing at a low cost due to its single series circuit consisting of the group of resistors and the MOS transistor. In addition, it is also possible to prevent noise or the like from the external terminal from acting on the temperature information supplied to the internal circuit.

It is thus possible in the case of the supply of the temperature information to the internal circuit in the same manner as in the second embodiment to provide temperature information without being affected by noise from the external terminal.

The procedure for adjusting the temperature sensor of the third embodiment is also similar to the case of the first embodiment described above.

Although the PROM 8 can be any writable non-volatile memory, a one-time PROM permitting only one writing must use a pull-up resistor or a pull-down resistor to achieve a circuit configuration ensuring that the external terminal switch 10 is put in the closed state at the stage previous to the writing of the adjusting data.

Alternatively, in the case of using as the PROM a rewritable non-volatile memory such as an EEPROM, there is no restriction in the circuit configuration and the adjusting procedure can be as follows.

That is, the adjusting data are first written to the PROM 8 so as to allow the external terminal switch 10 to be put in the closed state, and then the adjustment is made for eliminating the manufacturing variation by use of the external terminal 6, and finally the adjusting data in the PROM 8 are rewritten so as to allow the external terminal switch 10 to be put in the open state.

In the case of employing such an adjustment procedure, there is no necessity to make all the bits of the PROM 8 rewritable and it is sufficient that only the bits corresponding to the adjusting data for the opening and closing of the external terminal switch 10 be rewritable.

Although some embodiments of the present invention have been specifically described, the present invention is not intended to be limited to the above embodiments and it is natural that various modifications are possible without departing from the gist thereof.

For example, the temperature sensor of the third embodiment shown in FIG. 3 has a configuration in which the internal circuit receives temperature information directly from the MOS transistor 5. However, a switch similar to the external terminal switch 10 may be disposed between the internal circuit and the drain of the MOS transistor 5 so as to allow the conditions of the internal circuit and the external terminal 6 to coincide with each other.

As described in the above embodiments, by using the series connection of the resistor group having a trimming function under the on-off control of the PROM with the MOS transistor and using the external terminal connected to the connection thereof, adjustment is first made to eliminate the manufacturing variation of the resistors, and then the gate voltage of the MOS transistor is adjusted so that the voltage output from the external terminal results in a predetermined value, thereby making it possible to allow an out-of-standard temperature sensor attributable to manufacturing variation to lie within the standards.

Thus, an improvement in the manufacturing yield is achieved and there can be provided a temperature sensor which provides high precision analog temperature information free from any manufacturing variation without increasing production costs.

What is claimed is:

1. A temperature sensor comprising:
    a first power supply and a second power supply;
    a resistor group connected to said second power supply and consisting of a plurality of resistors connected in series;
    a switch group consisting of a plurality of switches for opening and closing the connections between connection points of the adjacent resistors of said resistor group and said second power supply;
    a MOS transistor in the form of a temperature transducer, connected in series with said resistor group and having a source and a bulk which are connected to said first power supply;
    an external terminal connected to a drain of said MOS transistor;
    a temperature-compensated constant voltage generating means receiving a reference voltage from said first power supply and applying a gate voltage as its output voltage to said MOS transistor; and a non-volatile memory which stores therein data for adjusting the output voltage from said temperature-compensated constant voltage generating means and the state of opening and closing of said switches of said switch group; wherein, with the voltage at said second power supply as the reference, the drain voltage at said MOS transistor is applied as temperature information to said external terminal.

2. A method of compensating a signal of a temperature sensor in including a first power supply and a second power supply; a resistor group connected to said second power supply and consisting of a plurality of resistors connected in series; a switch group consisting of a plurality of switches for opening and closing the connections between connection points of the adjacent resistors of said resistor group and said second power supply; an MOS transistor in the form of a temperature transducer, connected in series with said resistor group and having a source and a bulk which are connected to said first power supply; an external terminal connected to a drain of said MOS transistor; a temperature-compensated constant voltage generating means for receiving a reference voltage from the first power supply and applying a gate voltage a its output voltage to the MOS transistor; and a non-volatile memory which stores therein data for adjusting the output voltage from the temperature-compensated constant voltage generating means and the state of opening and closing of the switches of the switch group, the method comprising the steps of:

performing resistance adjustment by writing to said non-volatile memory the adjusting data for setting the state of opening and closing of each switch of said switch group so that a resistance value between said external terminal and said second power supply results in a predetermined value; and compensating an output voltage from said temperature-compensated constant voltage generating means by writing said adjusting data to said non-volatile memory so that an output voltage from said external terminal with the voltage at said second power supply as reference results in a predetermined value.

3. A temperature sensor comprising:

a first power supply and a second power supply;

two resistor groups having like characteristics connected in parallel with said second power supply, each group consisting of a plurality of resistors connected in series;

two switch groups each consisting of a plurality of switches for opening and closing connections between connection points of the adjacent resistors of each of said two resistor groups and said second power supply;

two MOS transistors in the form of temperature transducers having like characteristics, each connected in series with each of said resistor groups and each having a source and a bulk connected to said first power supply;

an external terminal connected to a drain of one of said two MOS transistors;

a temperature-compensated constant voltage generating means receiving a reference voltage from said first power supply and applying the same gate voltage as its output voltage to each of said MOS transistors; and a non-volatile memory which stores therein data for adjusting the output voltage from said temperature-compensated constant voltage generating means and the state of opening and closing of each switch of said switch groups; wherein, with the voltage at said second power supply as the reference, a drain voltage at the other of said two MOS transistors is applied as temperature information to an internal circuit.

4. A method of compensating a signal of a temperature sensor, including a first power supply and a second power supply: two resistor groups having similar characteristics connected in parallel with said second power supply, each group consisting of a plurality of resistors connected in series; two switch groups each consisting of a plurality of switches for opening and closing connections between connection points of the adjacent resistors of each of said two resistor groups and said second power supply; two MOS transistors in the form of temperature transducers having similar characteristics, each connected in series with each of said resistor groups and each having a source and a bulk connected to said first power supply; an external terminal connected to a drain of one of said two MOS transistors; a temperature-compensated constant voltage generating means for receiving a reference voltage from said first power supply and applying the same gate voltage as its output voltage to each of said MOS transistors; and a non-volatile memory which stores therein data for adjusting the output voltage from said temperature-compensated constant voltage generating means and the state of opening and closing of each switch of said switch groups, the method comprising the steps of:

performing a resistance adjustment by writing to said non-volatile memory the adjusting data for setting the state of opening and closing of each switch of said two switch groups so that a resistance value between said external terminal and said second power supply results in a predetermined value; and compensating an output voltage from said temperature-compensated constant voltage generating means by writing said adjusting data to said non-volatile memory so that an output voltage from said external terminal with the voltage at said second power supply as reference results in a predetermined value.

5. A temperature sensor comprising:

a first power supply and a second power supply;

a resistor group connected to said second power supply consisting of a plurality of resistors connected in series;

a switch group consisting of a plurality of switches for opening and closing connections between connection points of the adjacent resistors of said resistor group and said second power supply;

a MOS transistor in the form of a temperature transducer connected in series with said resistor group and having a source and a bulk which are connected to said first power supply;

an external terminal connected via an external terminal switch to a drain of said MOS transistor;

a temperature-compensated constant voltage generating means receiving a reference voltage from said first power supply and applying a gate voltage as its output voltage to said MOS transistor; and a non-volatile memory which stores therein data for adjusting the output voltage from said temperature-compensated constant voltage generating means and the state of opening and closing of said switches of said switch group; wherein with the voltage at said second power supply as the reference, the drain voltage at said MOS transistor is applied as temperature information to an internal circuit.

6. A method of compensating a signal of a temperature sensor, including a first power supply and a second power supply; a resistor group connected to said second power supply consisting of a plurality of resistors connected in series; a switch group consisting of a plurality of switches for opening and closing connections between connection points of the adjacent resistors of said resistor group and said second power supply; an MOS transistor in the form of a temperature transducer connected in series with said resistor group and having a source and a bulk which are connected to said first power supply; an external terminal connected via an external terminal switch to a drain of said MOS transistor; a temperature-compensated constant voltage generating means for receiving a reference voltage from said first power supply and applying a gate voltage as its output voltage to said MOS transistor; and a non-volatile memory which stores therein data for adjusting the output voltage from said temperature-compensated constant voltage generating means and the state of opening and closing of said switches of said switch group, the method comprising the steps of:

performing resistance adjustment by writing to said non-volatile memory the adjusting data for setting the state of opening and closing of each switch of said switch group so that a resistance value between said external terminal and said second power supply results in a predetermined value with said external terminal switch closed;

compensating an output voltage from said temperature-compensated constant voltage generating means by writing said adjusting data to said non-volatile memory so that an output voltage from said external terminal with the voltage at said second power supply as reference results in a predetermined value; and opening said external terminal switch.

7. A method of compensating the signal of the temperature sensor according to claim 6, wherein the closed state and the open state of said external terminal switch is set by writing to said non-volatile memory the adjusting data for setting the state of opening and closing of said switch.

* * * * *

UNITED STATES PATENT AND TRADEMARK OFFICE
CERTIFICATE OF CORRECTION

PATENT NO.: 5,993,060
DATED : November 30, 1999
INVENTOR(S): Yasuhiro SAKURAI

It is certified that an error appears in the above-identified patent and that said Letters Patent is hereby corrected as shown below:

In the claims;

In claim 2 on line 13 of column 9, change "sensor in including ...." to be --sensor including ....--.

Signed and Sealed this

Fourteenth Day of November, 2000

*Attest:*

Q. TODD DICKINSON

*Attesting Officer*      *Director of Patents and Trademarks*